July 18, 1950  J. G. MYERS  2,515,417
OILER FOR PNEUMATIC TOOLS AND THE LIKE
Filed Aug. 3, 1946

INVENTOR
John G. Myers
ATTORNEYS

Patented July 18, 1950

2,515,417

UNITED STATES PATENT OFFICE 2,515,417

OILER FOR PNEUMATIC TOOLS AND THE LIKE

John G. Myers, Grand Haven, Mich., assignor to Keller Tool Company, Grand Haven, Mich., a corporation of Michigan Application August 3, 1946, Serial No. 688,304

1 Claim. (Cl. 184—56)

The present invention pertains to improvements in oilers for pneumatic tools and the like whereby lubricant is introduced into the air stream for delivery to the operating components.

Generally stated, the object of the invention is to provide a new and improved oiler for pneumatic tools and the like whereby oil is delivered under pressure from a well or receptacle containing the oil supply through the medium of a porous conducting member projecting directly into the air stream.

Another object of the present invention is to introduce the lubricant into the air stream in the form of a foam.

The objects of the invention thus generally set forth, together with other and and ancillary advantages, are attained by the construction and arrangement shown by way of illustration in the accompanying drawings, in which.

Figure 1:
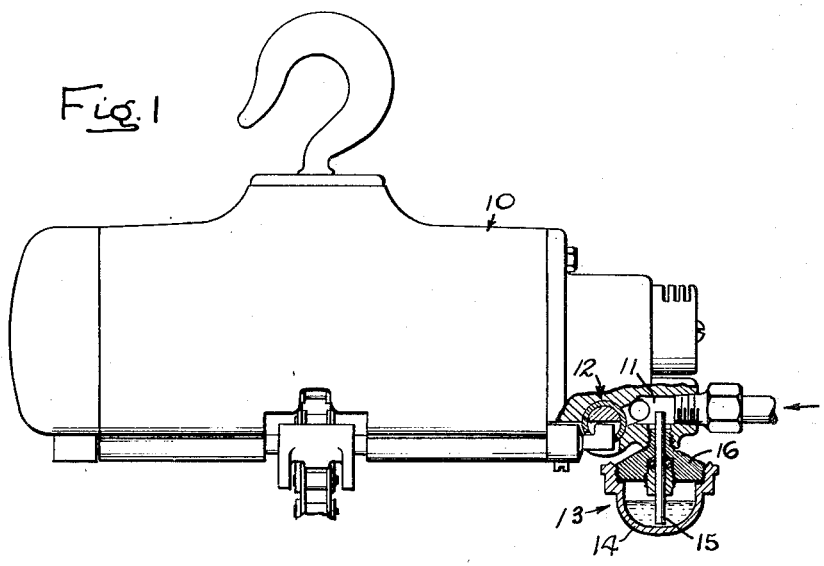
Figure 1 is a general view, partly in section, of a pneumatic hoist equipped with an oiler embodying the present invention.
Figure 2:
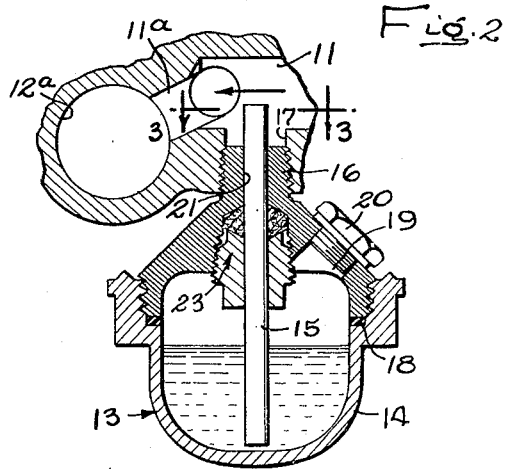
Fig. 2 is an enlarged detailed sectional view through the oiler.
Figure 3:
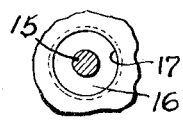
Fig. 3 is a detailed vertical sectional view taken substantially along line 3—3 of Fig. 2.

Referring more particularly to the exemplary embodiment of the invention illustrated in the drawings, the improved oiler is shown applied to a pneumatic hoist 10 having a longitudinal inlet passage 11 from which air is delivered to the tool under the control of a valve mechanism 12, the latter having a chamber 12a connected with the passage 11 by a transverse passage 11a. Generally stated, the oiler comprises a closed well 13 formed in part by a cup-shaped member 14 for containing liquid lubricant which is conducted to the air inlet passage 11 through the medium of a porous conducting member 15.

The cup-shaped member 14 is attached to the tool by means of a fitting 16 screw threaded into a bore 17 opening into the inlet passage 11, a sealing gasket 18 being interposed between the member 14 and the fitting. The fitting 16 coacts with member 14 to form the well 13 of the oiler and has a filler opening 19 equipped with a screw threaded closure plug 20. The porous conducting member 15 is preferably in the form of a rod of sintered material such as metal or glass. The member 15 passes through a bore 21 in fitting 16 and is sealed therein by means of a packing gland 23 preferably including a packing material such as rubber. The packing gland 23 serves additionally to permit axial adjustment of the position of the member 15 within the bore 21 whereby the extent to which the member projects into the inlet passage 11 can be varied. Thus the amount of surface area exposed to the action of the air stream and consequently the rate of introduction of lubricant can be controlled. It extends from a point below liquid level and near the bottom of cup-shaped member 14, and protrudes into the inlet passage 11.

When the valve mechanism 12 is in its closed position, permitting no flow of air, pressure will build up in the air inlet passage and also in the well. Capillary attraction will maintain lubricant continuously available at the protruding end of the porous conducting member 15.

When the valve is opened permitting air to flow through the inlet passage 11 the wiping action of the air on the protruding end of member 15 will cause an increase in vapor pressure difference, resulting in the seeping of more lubricant up the member 15. Also, a pressure differential will result between the inlet passage and the well causing a still grater flow of lubricant through the member 15, since it affords the only communication between the well and the air inlet passage. Because of the character of member 15 there will be no sudden loss of this pressure differential and the lubricant will appear in the form of a foam at the upper end of the member.

The use of a porous conducting member in the form of a sintered rod has also been found advantageous from the standpoint of durability and effectiveness. Thus it effectually resists erosion by the action of the air stream. Moreover, it is possible to control readily the rate of flow of the oil, since such rate is determined by the porosity of the rod and the extent to which it projects into the air stream and it is not subject to tampering. Finally, the rod is effectually secured in position in the device in such a way as to permit easy replacement and is rendered readily accessible for cleaning purposes by the removable mounting of the receptacle.

I claim as my invention:

An oiler for a pneumatic tool or the like having an air inlet passage, comprising, in combination, a cup-shaped receptacle adapted to contain liquid lubricant, and a fitting removably supporting said receptacle and coacting therewith to form a well, said fitting having a bore therethrough for communication with the inlet passage of the tool, a porous conducting rod of sintered material in said bore, and a packing gland disposed about said rod and coacting with said bore to seal the rod therein, said packing gland permitting axial adjustment of the position of said rod to vary the projection thereof into the inlet passage of the tool.

JOHN G. MYERS.

REFERENCES CITED

The following references are of record in the file of this patent:

UNITED STATES PATENTS

| Number | Name | Date |
|---|---|---|
| 1,121,595 | Steedman | Dec. 15, 1914 |
| 1,336,984 | Wood | Apr. 13, 1920 |
| 1,961,477 | Davis | June 5, 1934 |
| 2,111,583 | DeMooy | Mar. 22, 1938 |